(12) United States Patent
Jeon et al.

(10) Patent No.: US 11,726,668 B2
(45) Date of Patent: Aug. 15, 2023

(54) DEVICE WITH FLASH MEMORY AND METHOD FOR WRITING/ERASING/UPDATING DATA IN FLASH MEMORY THEREOF

(71) Applicant: ELECTRONICS AND TELECOMMUNICATIONS RESEARCH INSTITUTE, Daejeon (KR)

(72) Inventors: Yong-Sung Jeon, Daejeon (KR); Doo-Ho Choi, Daejeon (KR); Ha-Young Seong, Daejeon (KR); Mi-Kyung Oh, Daejeon (KR); Sang-Jae Lee, Daejeon (KR); Ik-Kyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/507,727

(22) Filed: Oct. 21, 2021

(65) Prior Publication Data

US 2022/0155974 A1 May 19, 2022

(30) Foreign Application Priority Data

Nov. 18, 2020 (KR) .................. 10-2020-0154711

(51) Int. Cl.
*G06F 3/06* (2006.01)
(52) U.S. Cl.
CPC .......... *G06F 3/0619* (2013.01); *G06F 3/0652* (2013.01); *G06F 3/0659* (2013.01); *G06F 3/0673* (2013.01)

(58) Field of Classification Search
CPC .... G06F 3/0619; G06F 3/0652; G06F 3/0659; G06F 3/0673; G06F 12/0246
See application file for complete search history.

(56) References Cited

U.S. PATENT DOCUMENTS

2013/0117496 A1\* 5/2013 Lyubman ............. G11C 16/102
711/E12.008
2015/0301944 A1 10/2015 Lu
(Continued)

FOREIGN PATENT DOCUMENTS

| CN | 113785275 A | \* | 12/2021 |
| KR | 10-2002-0078230 A | | 10/2002 |
| KR | 10-2011-0070656 A | | 6/2011 |

*Primary Examiner* — Edward J Dudek, Jr.
(74) *Attorney, Agent, or Firm* — LRK Patent Law Firm

(57) ABSTRACT

Disclosed herein is a device equipped with flash memory, which includes memory in which at least one program is recorded and a processor for executing the program. The memory includes flash memory including a data area and a backup area, and the program divides data into two or more segments depending on whether the data can be stored in a single page and stores the same in the data area. The first segment is stored in a page along with a segment number, indicating the sequential position of the divided data, a segment offset, indicating the number of pages between the pages in which the current segment and the next segment are stored, the size of a data file name, the size of the data, and the file name. At least one additional segment may be stored in another page along with the segment number and segment offset thereof.

19 Claims, 11 Drawing Sheets

(56) References Cited

U.S. PATENT DOCUMENTS

| | | | | |
|---|---|---|---|---|
| 2019/0258729 | A1* | 8/2019 | Jeon | G06F 3/0679 |
| 2020/0319999 | A1* | 10/2020 | Makuni | G06F 12/0848 |
| 2021/0326266 | A1* | 10/2021 | Curtis-Maury | G06F 11/1469 |
| 2022/0043724 | A1* | 2/2022 | Lee | G06F 11/1469 |

* cited by examiner

| | 310 | 321 | 322 | 323 |
| --- | --- | --- | --- | --- |
| | | 243 244 247 | 248 251 | 252 255 |
| PAGE 0 | | WRITE BACKUP FLAG | ERASE BACKUP FLAG | UPDATE BACKUP FLAG |
| PAGE 1 | | | | |
| ⋮ | | | | |
| PAGE 2 | | | | |
| ⋮ | | | | |
| PAGE 11 | | | | |
| PAGE 12 | | | | |
| PAGE 13 | | | | |
| PAGE 14 | | | | |
| PAGE 15 | | | | |

FIG. 3

DEVICE WITH FLASH MEMORY AND METHOD FOR WRITING/ERASING/UPDATING DATA IN FLASH MEMORY THEREOF

CROSS REFERENCE TO RELATED APPLICATION

This application claims the benefit of Korean Patent Application No. 10-2020-0154711, filed Nov. 18, 2020, which is hereby incorporated by reference in its entirety into this application.

BACKGROUND OF THE INVENTION

1. Technical Field

The disclosed embodiment relates to technology for securely protecting data stored in flash memory when important data is stored in flash memory in a low-specification embedded device.

2. Description of Related Art

Flash memory is used for various types of electronic devices requiring storage of data, because flash memory is nonvolatile memory that retains data even when power is turned off.

Such flash memory is generally classified into NOR flash memory and NAND flash memory.

NAND flash memory is mainly used for storing a large amount of data. NOR flash memory is mainly used for storing and processing executable code and data due to being connected with a CPU in an embedded device, because NOR flash memory has a parallel structure and provides faster access speed than NAND flash memory. Also, these characteristics of NOR flash memory enable access to an arbitrary cell, regardless of the sequential position of the cell.

The present invention to be described hereinbelow relates to secure storage of data processed by a CPU in an embedded device, and a description will be made with a focus on NOR flash memory.

Meanwhile, one of the main characteristics of flash memory is that an operation for updating data requires that the entire area containing the corresponding data be erased first. In other words, because it is impossible to overwrite data in flash memory, storing new data in a block in which data is already present requires the entirety of the block to be erased first. This process is cumbersome, and takes several to tens of milliseconds.

As described above, even when only a single byte of data is updated in flash memory, the data update can be performed only after the entirety of the area containing the byte is erased, rather than erasing only the corresponding byte.

Meanwhile, although various terms can be used to refer to an area erased at one time in flash memory, the terms "page", "sector" and "block" are used in the present invention. Generally, "page" indicates the minimum unit of an area that can be erased at one time, and has a size of hundreds of bytes, "sector" is formed of multiple pages and has a size of several to tens of kilobytes, and "block" is formed of multiple sectors. Here, a sector and a block may also be erased at one time.

As described above, in order to update even a single byte of data in flash memory, the entirety of the area containing the byte, that is, the entire page, has to be erased.

To this end, a conventional method is configured such that, after all data in the page is backed up to RAM, the specific byte to be updated is modified in the RAM, and all of the data of the page in the RAM is written back to the flash memory. This method has an advantage of fast speed because RAM is used for data backup. However, after data is backed up to RAM, if a device is suddenly powered off during erasure of a page in flash memory or after erasure of all data from the page, the data in the corresponding page may be lost.

Therefore, it is very important to securely preserve data stored in flash memory even in an unexpected situation in which power is suddenly turned off during processing of data in the flash memory.

Also, due to the intrinsic characteristics of flash memory, flash memory involves the risk of erasure of existing data stored in the flash memory during a data-processing procedure.

Particularly, when the data stored in the corresponding page area is confidential information (e.g., an encryption key, a certificate, or the like required for security), serious damage may be caused.

Also, existing file systems for managing flash memory are present, but the use thereof requires a considerable amount of resources, and thus it may be difficult to use existing file systems in low-specification embedded devices.

SUMMARY OF THE INVENTION

An object of an embodiment is to prevent data stored in flash memory from being lost even when power is suddenly turned off during a data-processing procedure, such as writing, erasing, or updating data in flash memory.

An embodiment is appropriate for an embedded device in which it is difficult to use existing file systems for flash memory, and the embodiment is intended to provide security in the procedure of processing data in flash memory, which is suitable for a low-specification embedded device in which NOR flash memory is generally mounted.

A device equipped with flash memory according to an embodiment includes memory in which at least one program is recorded and a processor for executing the program. The memory may include flash memory including a data area and a backup area, the program may selectively divide data into two or more segments depending on whether the data has a size capable of being stored in a single page, and store the data in the data area, a first segment may be stored in a single page, and at least one additional segment may be stored in another page.

Here, when the data has a size capable of being stored in a single page, the segment number, the segment offset, the size of the file name of the data, the size of the data, the file name, and the data may be stored in a corresponding segment, and the remaining area in the page may be maintained empty.

Here, the first segment is stored in a single page along with a segment number thereof, a segment offset thereof, a size of a file name of the data, a size of the data, and the file name, the at least one additional segment is stored in another page along with a segment number thereof and a segment offset thereof, the segment number indicates a sequential position of the divided data and the segment offset indicates a number of pages between a page in which a current segment is stored and a page in which a next segment is stored, the backup area may be located in the last sector of the flash memory, and backup flags, in which write, erase, and update states are recorded, and the page numbers of pages on which writing or erasing is to be performed may be recorded in the backup area, and the page numbers of the pages on which writing or erasing is to be performed may be recorded in the page following the page in which the backup flags are recorded.

Here, when the program writes new data to the flash memory, the program may perform calculating the page numbers of pages onto which the new data is to be written, among empty pages in the data area; sequentially storing the calculated page numbers in the backup area and setting a write backup flag; writing the new data onto the pages, corresponding to the calculated page numbers, in the data area; and completely erasing the backup area when writing the new data is completed.

Here, when the device is powered off before completion of the writing and when the write backup flag located in the backup area is determined to be set after the device is rebooted, the program may further perform erasing the pages in the data area corresponding to the page numbers stored in the backup area, which are the page numbers of the pages onto which the new data is to be written.

Here, when the program erases existing data stored in the flash memory, the program may perform calculating the page numbers of pages to be erased, among pages in which the existing data is stored in the data area; sequentially storing the calculated page numbers in the backup area and setting an erase backup flag located in the backup area; erasing the existing data stored in the pages, corresponding to the calculated page numbers, in the data area; and completely erasing the backup area when erasure of the existing data is completed.

Here, when the device is powered off before completion of the erasure and when the erase backup flag located in the backup area is determined to be set after the device is rebooted, the program may further perform erasing the pages in the data area corresponding to the page numbers stored in the backup area, which are the page numbers of the pages to be erased.

Here, when the program updates data stored in the flash memory, the program may perform calculating the page numbers of pages in which existing data to be erased is stored in the data area; calculating the page numbers of pages onto which new data is to be written, among empty pages in the data area; sequentially storing, in the backup area, the calculated page numbers of the pages onto which the new data is to be written and setting an update backup flag located in the backup area; writing the new data onto the pages corresponding to the calculated page numbers; sequentially storing, in the backup area, the calculated page numbers of the pages in which the existing data to be erased is stored and setting an erase backup flag located in the backup area when writing the new data is completed; erasing the existing data from the pages corresponding to the calculated page numbers; and completely erasing the backup area when erasure of the existing data is completed.

Here, the page numbers of the pages onto which the new data is to be written and the page numbers of the pages in which the existing data to be erased is stored may be sequentially recorded in different respective pages.

Here, when the device is powered off before completion of the update and when the update backup flag and the erase backup flag are respectively determined to be set and cleared after the device is rebooted, the program may further perform erasing the pages in the data area corresponding to the page numbers stored in the backup area, which are the page numbers of the pages onto which the new data is to be written.

Here, when the device is powered off before completion of the update and when both the update backup flag and the erase backup flag are determined to be set after the device is rebooted, the program may further perform erasing the pages in the data area corresponding to the page numbers stored in the backup area, which are the page numbers of the pages in which the existing data is stored.

A method for writing new data to flash memory in a device in which the flash memory, including a data area and a backup area, is embedded according to an embodiment may include calculating the page numbers of pages onto which the new data is to be written, among empty pages in the data area; sequentially storing the calculated page numbers in the backup area and setting a write backup flag; writing the new data onto the pages, corresponding to the calculated page numbers, in the data area; and completely erasing the backup area when writing the new data is completed.

Here, the method may further include, when the device is powered off before completion of the writing and when the write backup flag located in the backup area is determined to be set after the device is rebooted, erasing the pages in the data area corresponding to the page numbers stored in the backup area, which are the page numbers of the pages onto which the new data is to be written.

A method for erasing existing data stored in flash memory in a device in which the flash memory, including a data area and a backup area, is embedded according to an embodiment may include calculating the page numbers of pages to be erased, among pages in which the existing data is stored in the data area; sequentially storing the calculated page numbers in the backup area and setting an erase backup flag located in the backup area; erasing the existing data stored in the pages corresponding to the calculated page numbers; and completely erasing the backup area when erasure of the existing data is completed.

The method may further include, when the device is powered off before completion of the erasure and when the erase backup flag located in the backup area is determined to be set after the device is rebooted, erasing the pages in the data area corresponding to the page numbers stored in the backup area, which are the page numbers of the pages to be erased.

A method for updating data stored in flash memory in a device in which the flash memory, including a data area and a backup area, is embedded according to an embodiment may include calculating the page numbers of pages in which existing data to be erased is stored in the data area; calculating the page numbers of pages onto which new data is to be written, among empty pages in the data area; sequentially storing, in the backup area, the calculated page numbers of the pages onto which the new data is to be written and setting an update backup flag located in the backup area; writing the new data to the pages corresponding to the calculated page numbers; sequentially storing, in the backup area, the calculated page numbers of the pages in which the existing data to be erased is stored and setting an erase backup flag located in the backup area when writing the new data is completed; erasing the existing data stored in the pages corresponding to the calculated page numbers; and completely erasing the backup area when erasing the existing data is completed.

Here, the method may further include, when the device is powered off before completion of the update and when the update backup flag and the erase backup flag are respectively determined to be set and cleared after the device is rebooted, erasing the pages in the data area corresponding to the page numbers stored in the backup area, which are the page numbers of the pages onto which the new data is to be written.

Here, the method may further include, when the device is powered off before completion of the update and when both the update backup flag and the erase backup flag are determined to be set after the device is rebooted, erasing the pages in the data area corresponding to the page numbers stored in the backup area, which are the page numbers of the pages in which the existing data is stored.

BRIEF DESCRIPTION OF THE DRAWINGS

The above and other objects, features, and advantages of the present invention will be more clearly understood from the following detailed description taken in conjunction with the accompanying drawings, in which:

FIG. 3 is a structural diagram of a backup area of flash memory according to an embodiment;

DESCRIPTION OF THE PREFERRED EMBODIMENTS

Figure 1:
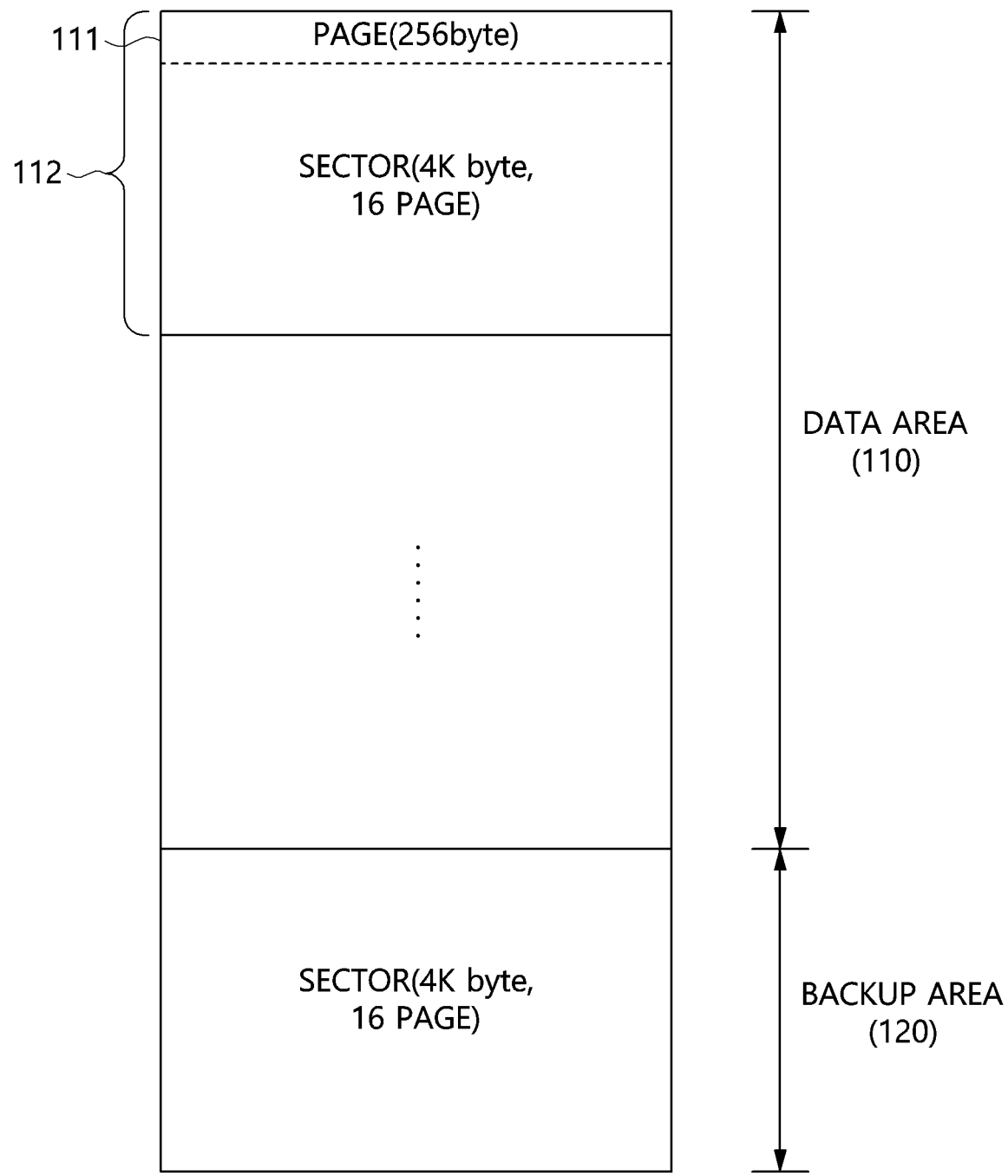
FIG. 1 is a view for explaining a method for using flash memory in a device according to an embodiment.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for securely protecting data in flash memory according to an embodiment will be described in detail with reference to FIGS. 1 to 10.

Flash memory is used in various embedded devices, such as IoT devices and the like, and particularly, in many cases, confidential information that has to be prevented from being deleted is stored in flash memory. That is, an encryption key, a certificate, and the like for security are stored in flash memory and used for various application services.

FIG. 1 is a view for explaining the method of using flash memory in a device according to an embodiment.

Referring to FIG. 1, a page 111 may be the minimum unit of flash memory capable of being erased at one time. According to an embodiment, a page 111 may be defined as 256 bytes.

A sector 112 may be formed of multiple pages 111. According to an embodiment, a sector 112 is formed of 16 pages, so the total size thereof may be 4 Kbytes. A block may be formed of multiple sectors 112.

Meanwhile, flash memory may be separated into a data area 110, in which data is stored, and a backup area 120 for backing up information about data according to an embodiment.

Here, the data area 110 is an area in which data is stored/managed through data-processing functions for flash memory, such as writing, erasing, and updating data. The data area 110 will be described in detail later with reference to FIG. 2.

Also, the backup area 120 is an area that is specially arranged in order to back up information about data in preparation for the case in which power is turned off while writing, erasing or updating of data is being performed in the data area 110. As illustrated in FIG. 1, the backup area 120 is located in the last sector of flash memory and includes 16 pages. The backup area 120 will be described in detail later with reference to FIG. 3.

Figure 2:
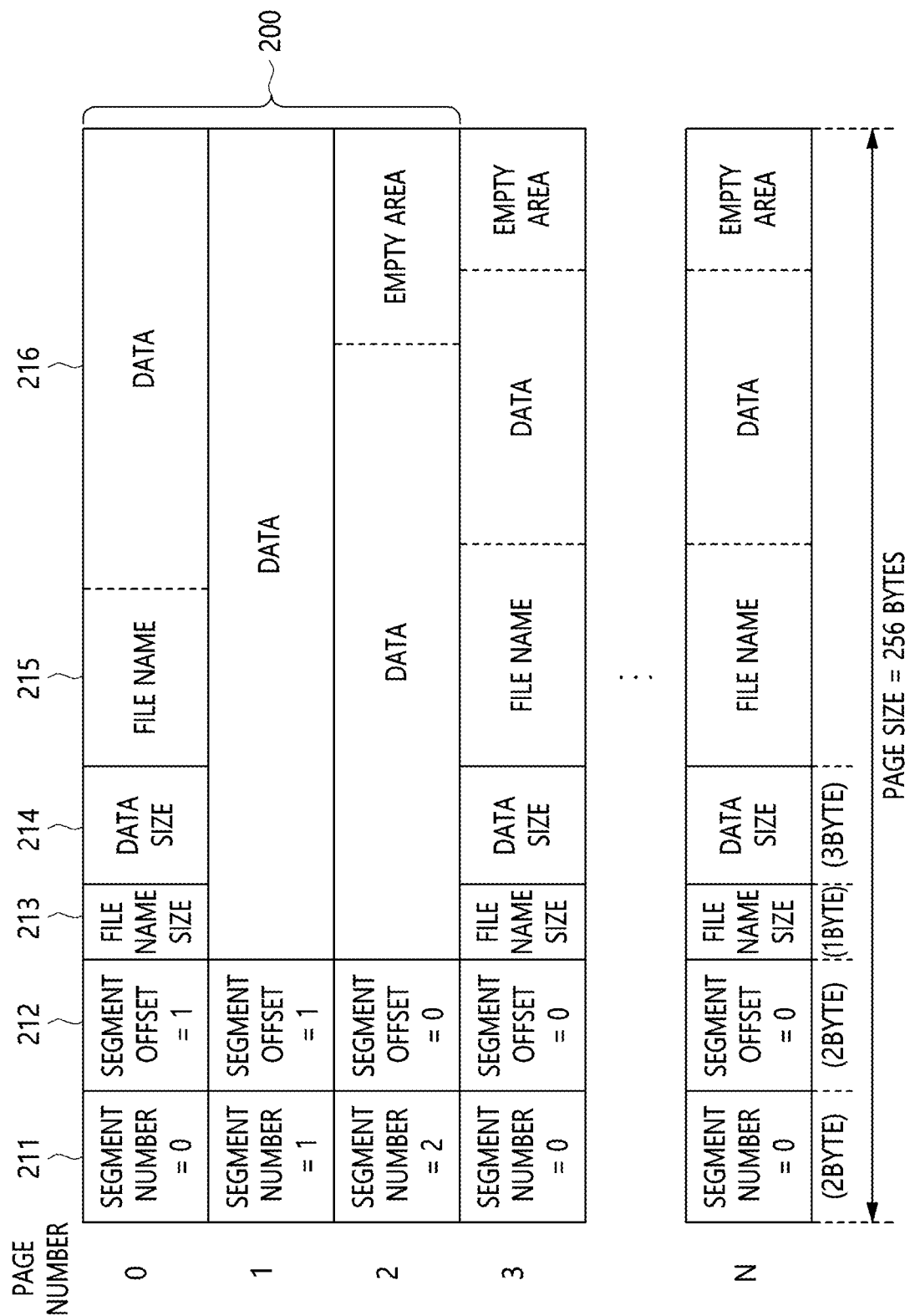
FIG. 2 is a structural diagram of a data area of flash memory according to an embodiment.

FIG. 2 is a structural diagram of a data area of flash memory according to an embodiment.

Because data is stored in units of pages, data that cannot be stored in a single page due to the size thereof is divided into multiple segments and then stored in multiple pages in a distributed manner according to an embodiment.

Referring to FIG. 2, a single chunk of data may be divided into three segments and then stored in three pages having page numbers 0, 1 and 2 in a distributed manner.

Here, pieces of information about the stored segment, that is, a segment number 211 and a segment offset 212, are also stored in each of the pages.

Here, the segment number 211 may be a number for identifying each of the segments into which a single chunk of data is divided. For example, as illustrated in FIG. 2, a segment number 211 of '0' indicates the first segment of a single chunk of data, a segment number of '1' indicates the second segment of the single chunk of data, and a segment number of '2' indicates the third segment of the single chunk of data. That is, the segment number may be set to an integer value that sequentially increases from '0' for a single chunk of data.

Here, a segment number of '0xFFFF' indicates that the page corresponding thereto is empty.

Meanwhile, the segment offset 212 indicates the location of the next segment, among the segments into which a single chunk of data is divided. That is, with regard to the segments of a single chunk of data, the segment offset 212 indicates the number of pages from the page in which the current segment is located to the page in which the next segment is located.

For example, as illustrated in FIG. 2, a segment offset 212 of '1' indicates that the next segment is located in the page following the page in which the current segment is located, and a segment offset of '0' indicates that the current segment is the last segment and that there is no segment subsequent thereto.

The reason why the segment offset is set as described above is because the segments of a single chunk of data cannot be stored in consecutive pages when data is repeatedly written and erased in flash memory multiple times.

That is, segments into which a single chunk of data is divided can be stored in consecutive pages having page numbers 0, 1, and 2, as illustrated in FIG. 2, but other data may be stored in between the pages in which the segments of the single chunk of data are respectively stored. Accordingly, the segment offsets may be used to connect segments included in a single chunk of data.

For example, the segment offset may be set to a value equal to or greater than '2', which indicates that the next segment is located two pages after the current segment.

Also, according to an embodiment, when data has a size capable of being stored in a single page and when the data is actually capable of being stored in a single page, the segment number is set to '0', as in the page of page number 3 illustrated in FIG. 3, and the segment offset may be set to '0'. That is, this indicates that the data stored in page 3 is formed of only a single segment.

Meanwhile, data may be stored in the form of a file in flash memory, and, as illustrated in FIG. 2, file information may be stored in the first page, among the pages in which segments are respectively stored.

Here, the file information may include a file name size 213, a data size 214, and a file name 215.

Accordingly, a segment number 211, a segment offset 212, a file name size 213, a data size 214, and a file name 215 are sequentially stored in the first segment, and data 216 may be stored to follow the same in the first segment.

Accordingly, as described above, whether to divide the data to be stored in flash memory is determined depending on whether the size of the data is greater than the size of the storage space allocable for data 216 in the first segment. That is, when the total size of the data satisfies the condition specified in Equation (1) below, the data has to be divided into multiple segments.

Total size of data>page size (256 bytes)−size of space for storing segment number (2 bytes)−size of space for storing segment offset (2 bytes)−size of space for storing file name size (1 bytes)−size of space for storing data size (2 bytes)−size of space for storing file name    (1)

FIG. 3 is a structural diagram of a backup area of flash memory according to an embodiment.

Referring to FIG. 3, a backup area 120 may be formed of 16 pages from pages 0 to 15.

Each of the pages in the backup area 120 may store a page number 310 and backup flags 321, 322 and 323 therein.

Here, the page number 310 may be the page number of the page in which data is located in the data area 110.

Here, the processing status of the data-processing function of flash memory may be set in the backup flags 321, 322 and 323.

These backup flags 321, 322 and 323 may be located at the end of each page, as illustrated in FIG. 3, such that the least frequently used part is used to store the backup flags in the process of performing a backup function.

Also, the backup flags may include a write backup flag 321, an erase backup flag 322, and an update backup flag 323.

Each of the write backup flag 321, the erase backup flag 322, and the update backup flag 323 is set when a data-processing function starts to be performed, and is cleared when the data-processing function is completed. Here, a value for the 'set' state may be '0x0', and a value for the 'clear' state may be '0xFFFF'.

Based on the value set in each of the backup flags 320, the status of the data-processing procedure using flash memory may be recognized. That is, when a device is booted, the device checks the backup flag. Here, if the backup flag is set, the device may realize that power was turned off during a data-processing procedure and that the data-processing procedure has not been completed. In this case, the device may complete data processing using the information stored in the backup area.

Referring to FIG. 3, 16 pages in the backup area may be sequentially used as the pages for storing backup flags.

That is, the backup flags are first stored in page 0, and when the next function is performed, the backup flags are stored in page 1. That is, the number of the page for storing the backup flags sequentially increases.

Here, pages up to page 12 are used to store the backup flags, and after page 12, page 0 is used to store backup flags. This is because, if only a single page is used, the number of times the specific area is used is increased, whereby the permissible number of accesses to the corresponding memory cell may be exceeded very quickly.

Hereinafter, the method of performing each of write, erase, and update operations using the above-described data area and backup area of flash memory and the structure of the backup area used therefor will be described in detail.

Figure 4:
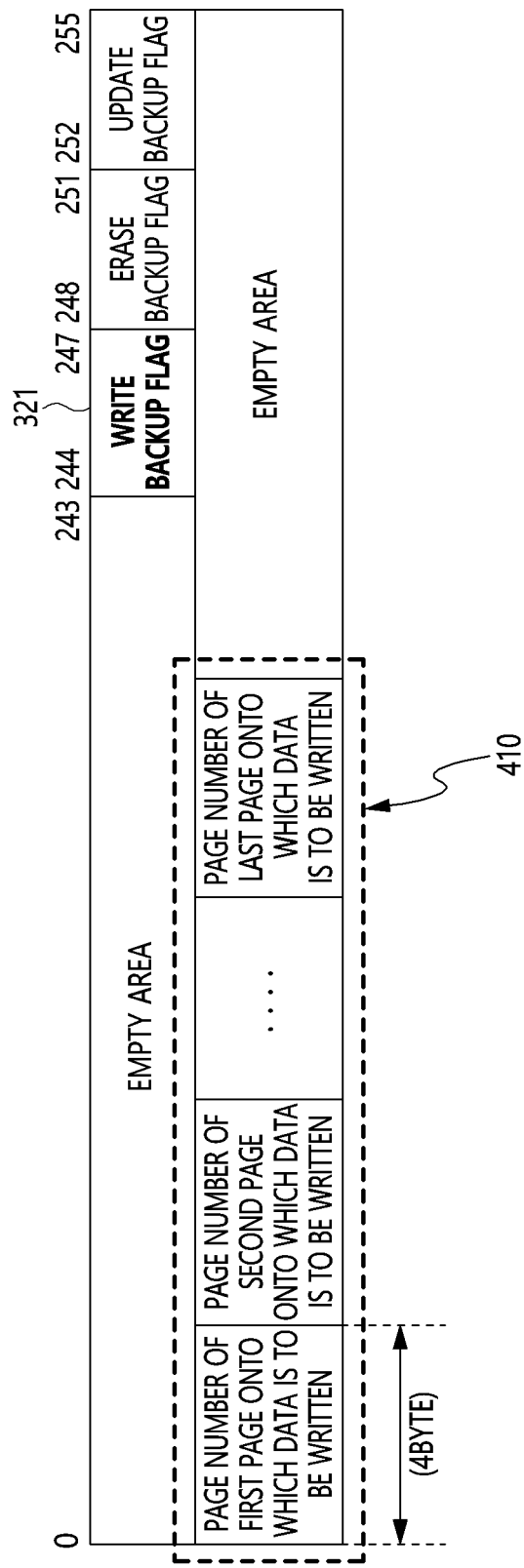
FIG. 4 is an exemplary view of a structural diagram of a backup area when a write function is performed according to an embodiment.
Figure 5:
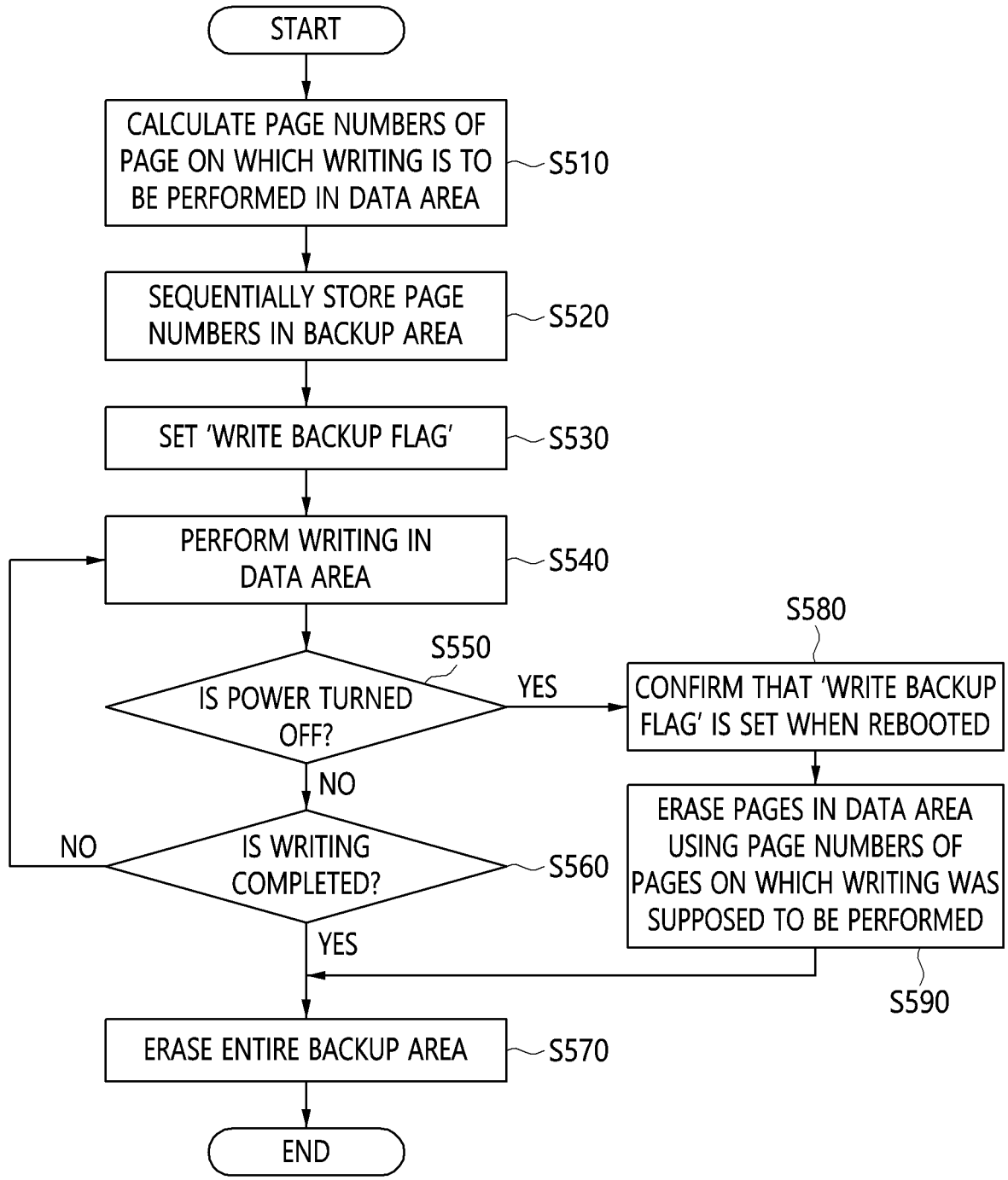
FIG. 5 is a flowchart for explaining a procedure in which a write function is performed in a device equipped with flash memory according to an embodiment.

FIG. 4 is an exemplary view of a structural diagram of a backup area when a write function is performed according to an embodiment, and FIG. 5 is a flowchart for explaining a procedure in which a write function is performed in a device equipped with flash memory according to an embodiment.

Referring to FIG. 4, when a write function is performed, two pages in the backup area are used. Here, a write backup flag 321 may be set and stored in the first page, and the numbers 410 of the pages onto which data is to be written may be stored in the second page, among the two pages.

Referring to FIG. 5, when the write function is started, the device calculates the numbers of the pages onto which data is to be written in the data area at step S510. That is, among empty pages in the data area, the numbers of the pages in which data is to be stored by performing the write function are calculated.

Subsequently, the device stores the calculated page numbers in the backup area at step S520. That is, referring to FIG. 4, the numbers of the pages in which data is to be stored are sequentially stored in the page 410 following the page in which the backup flag is stored.

Subsequently, the device sets the write backup flag 321 located in the backup area at step S530. That is, the value may be set to 0x0.

The device performs the function of writing data onto the pages corresponding to the page numbers, which are calculated at step S510, in the data area at step S540.

Here, when the device is not powered off while the write function is being performed (S550) and when writing onto the pages in the data area is completed (S560), the device erases the entire backup area at step S570. That is, because the backup area is a single sector formed of 16 pages according to an embodiment, the entire backup area can be erased at once using a sector erase function. Accordingly, the write function is completed.

However, if the device is powered off in the state in which the write function has not been completed (S550), when rebooted, the device may realize at step S580 that the write backup flag 321 located in the backup area is set. Accordingly, using the page numbers 420 stored in the backup area, which are the numbers of the pages onto which data is to be written, the device erases the corresponding pages in the data area at step S590. Accordingly, the garbage data in the data area, which is created by partially performing the write function, may be erased. Subsequently, the device erases the entire backup area at step S570.

Figure 6:
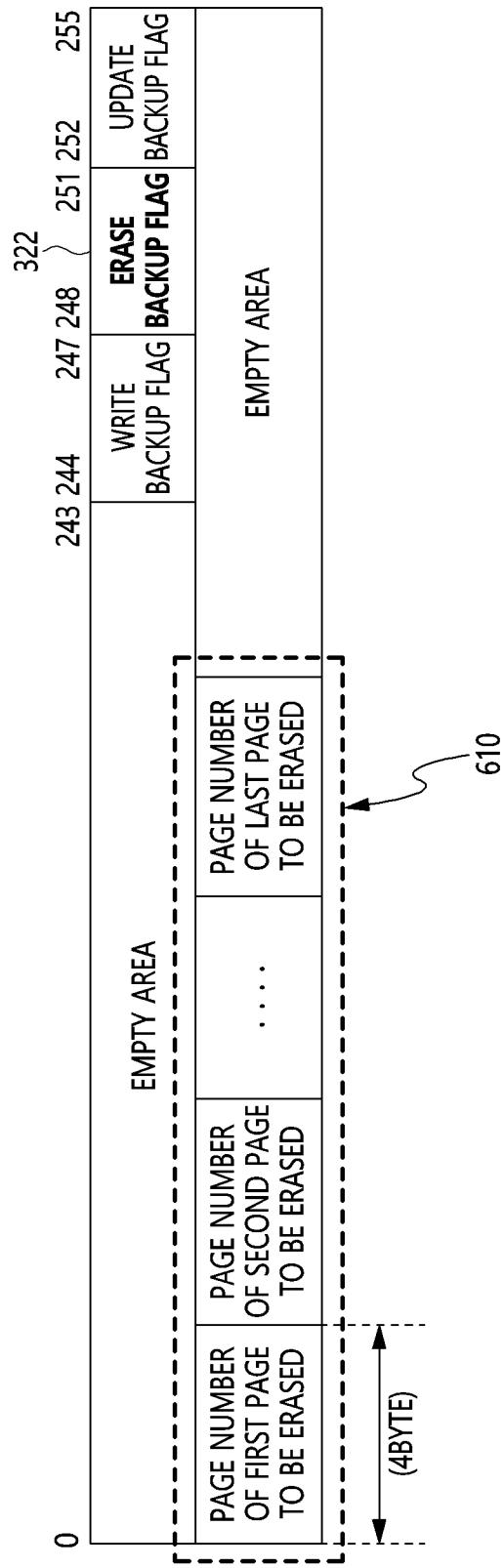
FIG. 6 is a structural diagram of a backup area when an erase function is performed according to an embodiment.
Figure 7:
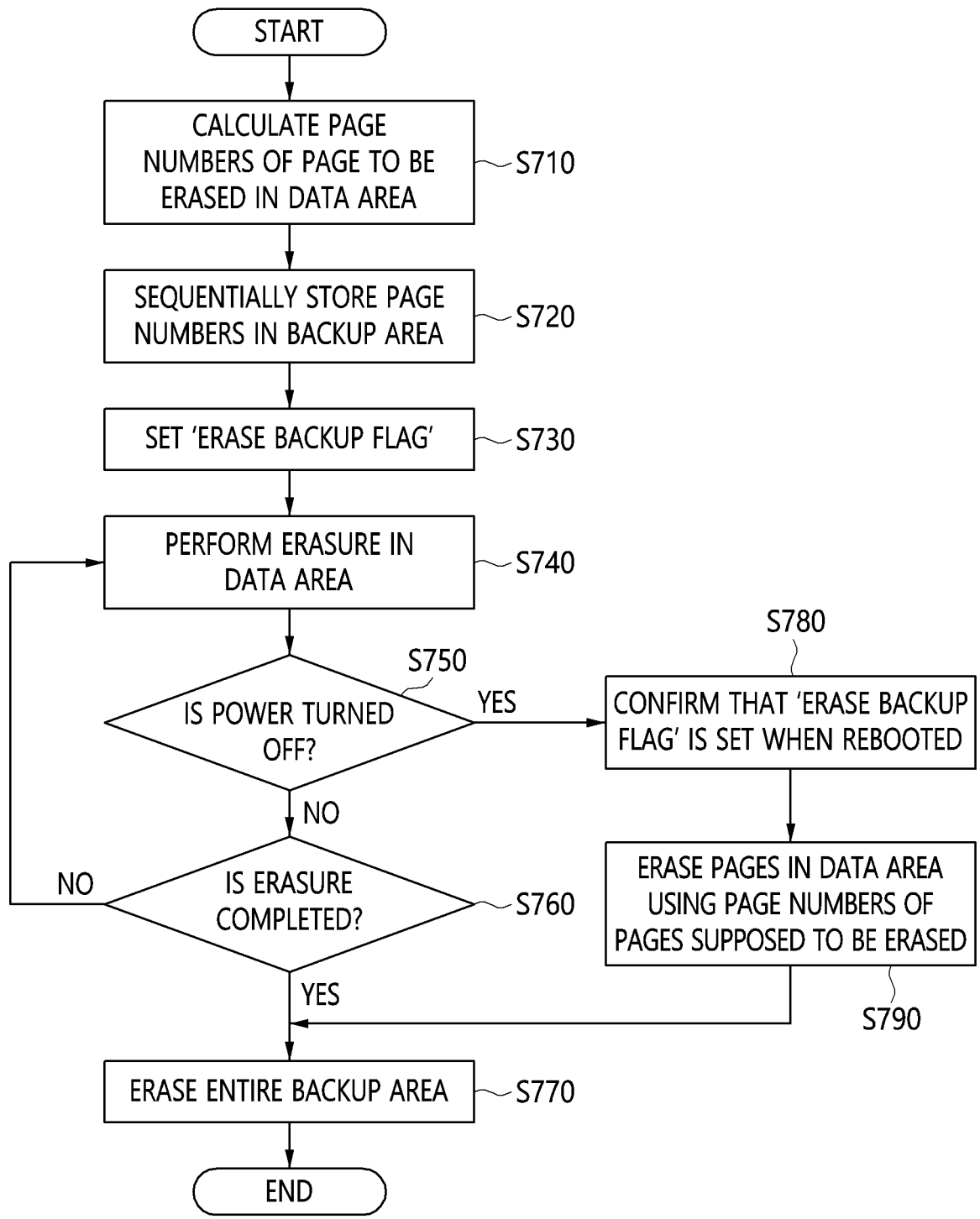
FIG. 7 is a flowchart for explaining a procedure in which an erase function is performed in a device equipped with flash memory according to an embodiment.

FIG. 6 is a structural diagram of a backup area when an erase function is performed according to an embodiment, and FIG. 7 is a flowchart for explaining a procedure in which an erase function is performed in a device equipped with flash memory according to an embodiment.

Referring to FIG. 6, when an erase function is performed, two pages in the backup area are used. Here, an erase backup flag 322 may be set and stored in the first page, and the numbers 610 of the pages from which data is to be erased may be sequentially stored in the second page, among the two pages.

Referring to FIG. 7, when an erase function is started, the device calculates the numbers of the pages from which data is to be erased in the data area at step S710. That is, among the pages in which data is stored in the data area, the numbers of the pages from which data is to be erased by performing the erase function are calculated.

Subsequently, the device stores the calculated page numbers in the backup area at step S720. That is, referring to FIG. 6, the numbers of the pages from which data is to be erased are sequentially stored in the page 610 following the page in which the backup flag is stored.

Subsequently, the device sets the erase backup flag 322 located in the backup area at step S730. That is, the value may be set to 0x0.

The device performs the function of erasing data from the pages corresponding to the page numbers calculated at step S710 in the data area at step S740.

Here, when the device is not powered off while the erase function is being performed (S750) and when erasing data from the corresponding pages in the data area is completed (S760), the device erases the entire backup area at step S770. In this case, because the backup area is a single sector formed of 16 pages in an embodiment, the backup area may be erased at once using a sector erase function. Accordingly, the erase function is completed.

However, if the device is powered off in the state in which the erase function has not been competed (S750), when rebooted, the device may realize at step 780 that the erase backup flag 322 located in the backup area is set. Accordingly, using the page numbers 610 stored in the backup area, which are the numbers of the pages from which data is to be erased, the device erases data from the corresponding pages in the data area at step S790. Accordingly, erasure of the data may be completed. Subsequently, the device erases the entire backup area at step S770.

Figure 8:
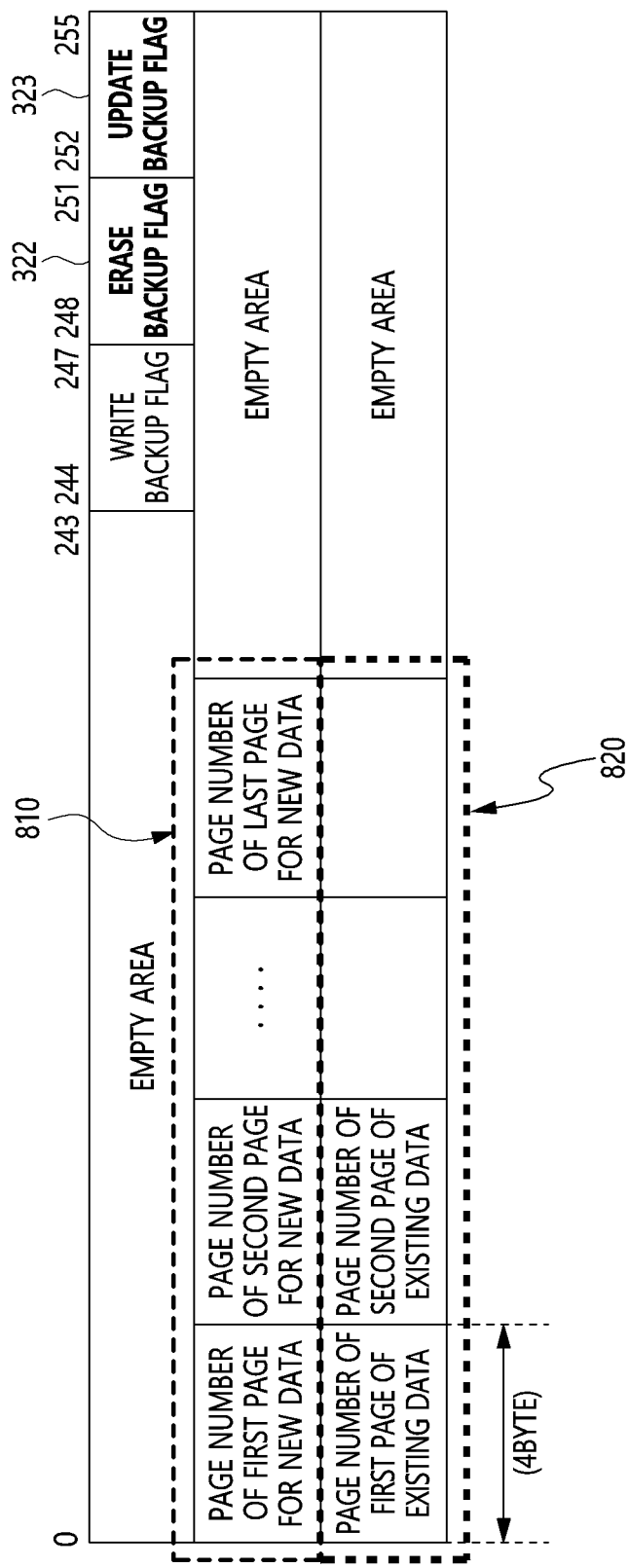
FIG. 8 is a structural diagram of a backup area when an update function is performed according to an embodiment.
Figure 9:
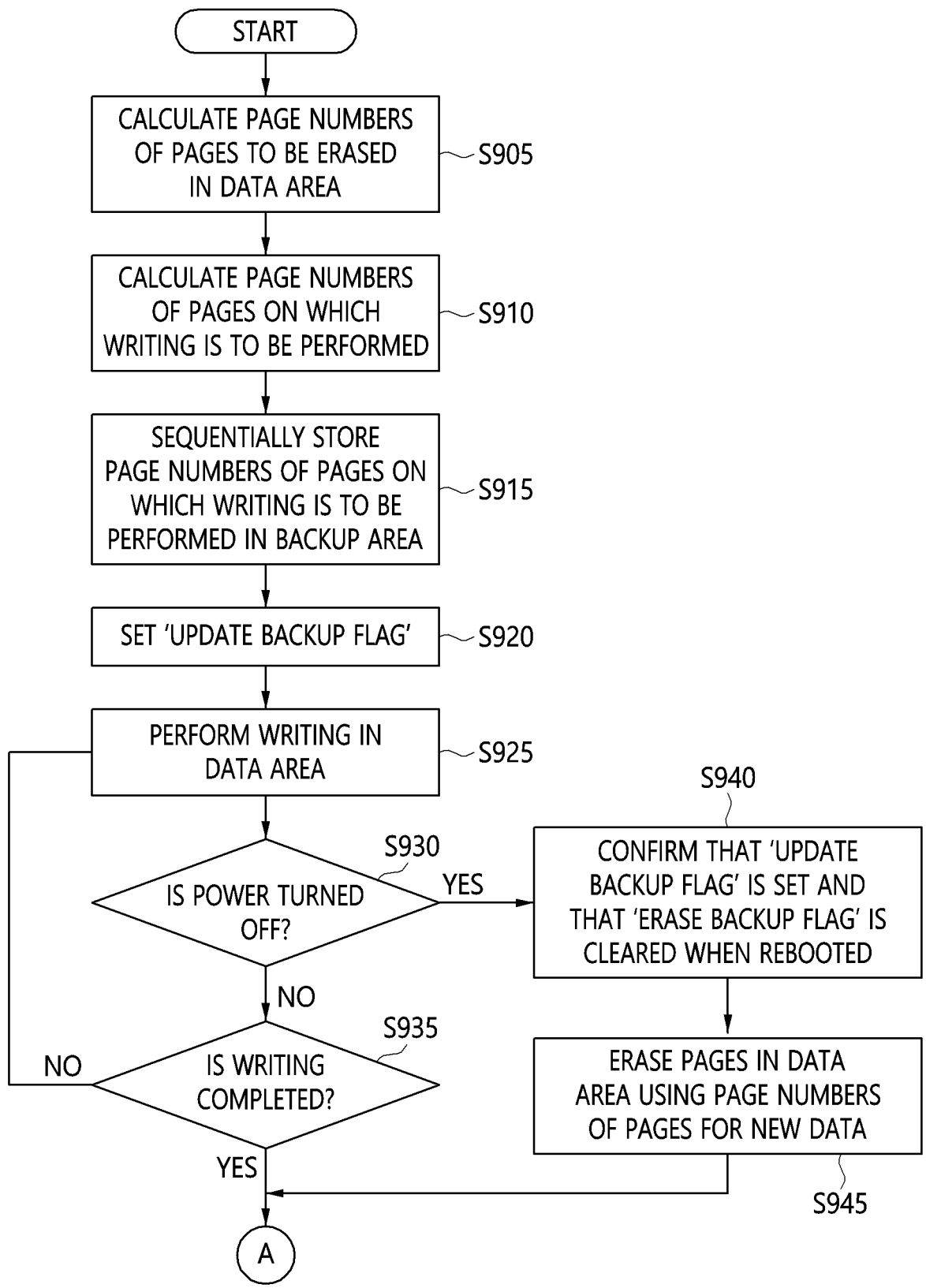
FIGS. 9 and 10 are flowcharts for explaining a procedure in which an update function is performed in a device equipped with flash memory according to an embodiment.
Figure 10:
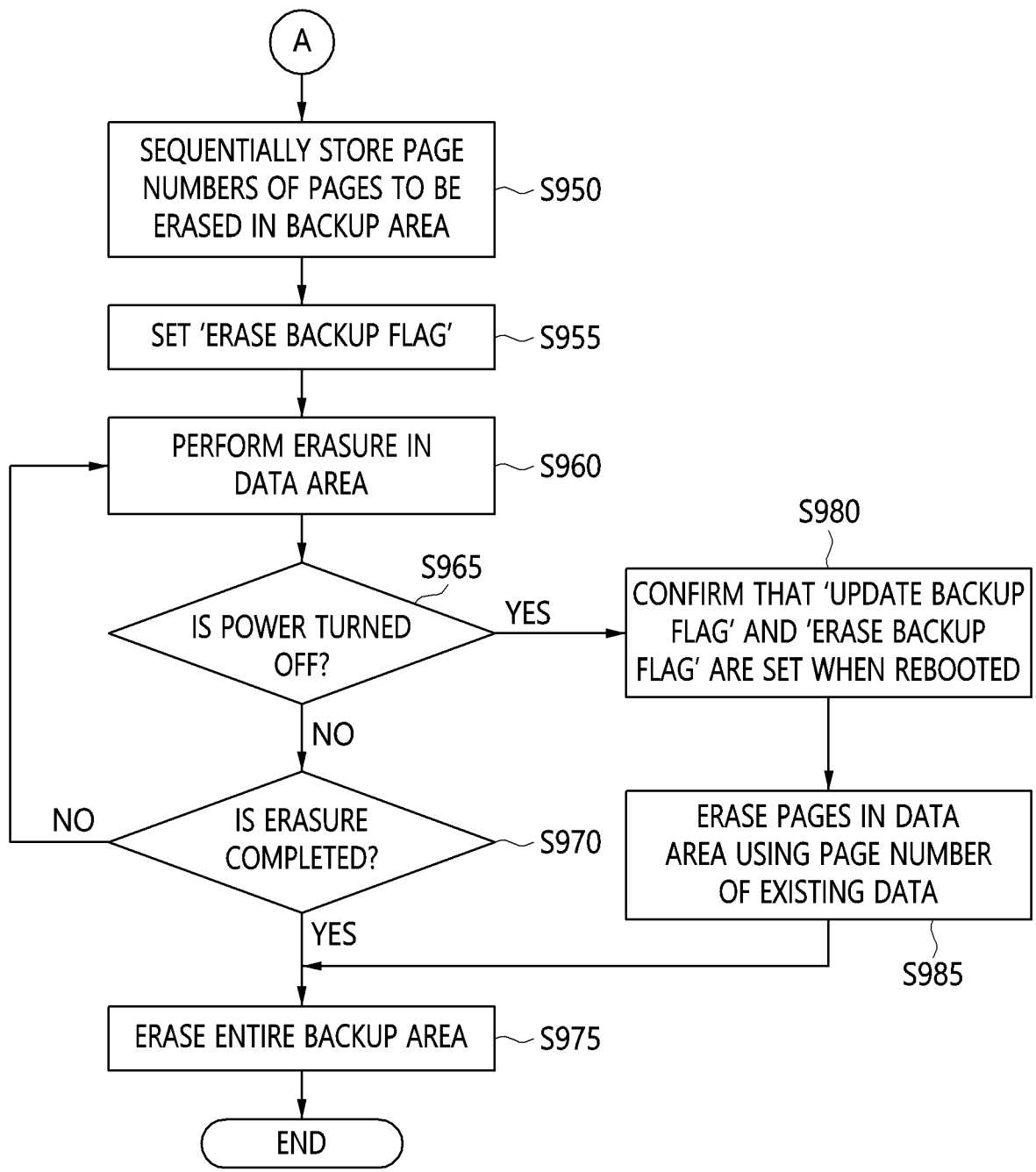

FIG. 8 is a structural diagram of a backup area when an update function is performed according to an embodiment, and FIGS. 9 and 10 are flowcharts for explaining a procedure in which an update function is performed in a device equipped with flash memory according to an embodiment.

Referring to FIG. 8, when an update function is performed, three pages in the backup area are used. That is, backup flags 322 and 323 may be set and stored in the first page, the numbers 810 of the pages onto which data is to be written may be stored in the second page, and the numbers 820 of the pages from which data is to be erased may be stored in the third page.

Here, the backup flags that are used when the update function is performed may include two backup flags, namely an erase backup flag 322 and an update backup flag 323.

Referring to FIG. 9, when an update function is started, the device calculates the numbers of the pages from which data is to be erased in the data area at step S905. That is, because existing data has to be erased in order to update the data, the numbers of the pages in which the existing data is stored in the data area are calculated.

Subsequently, the device calculates the numbers of the pages onto which data is to be written in the data area at step S910. That is, the numbers of the pages in which data is to be stored by performing the write function, among empty pages in the data area, are calculated.

That is, in order to perform data update, an embodiment uses a method in which new data is written onto empty pages first and then existing data is erased, rather than erasing the existing data first and writing new data in the location from which the existing data is erased, and thus steps S905 and S910 are respectively performed for the erase operation and the write operation.

Accordingly, the device stores the calculated numbers of the pages, onto which new data is to be written, in the backup area at step S915. That is, referring to FIG. 8, the numbers 810 of the pages in which the new data is to be stored are sequentially stored in the page following the page in which the backup flags are stored.

Subsequently, the device sets the update backup flag 323 located in the backup area at step S920. Here, the value is set to 0x0.

The device performs the write function for the pages, corresponding to the page numbers calculated at step S910, in the data area at step S925.

Here, if the device is powered off in the state in which the write function (S925) has not been completed (S930), when rebooted, the device may realize at step S940 that the update backup flag 323 located in the backup area is set. Here, the state in which the update backup flag 323 is set but the erase backup flag 322 is cleared indicates that the power was turned off in the state in which writing of new data was not completed. In this case, using the page numbers 810 stored in the backup area, which are the numbers of the pages onto which new data is to be written, the corresponding pages in the data area are erased at step S945.

Conversely, when the device is not powered off while the write function is being performed (S930) and when writing to the corresponding pages in the data area is completed (S935), the device stores the page numbers, which are calculated at step S905 as the numbers of the pages from which data is to be erased, in the backup area at step S950, as illustrated in FIG. 10. That is, as illustrated in FIG. 8, the numbers 820 of the pages from which the existing data is to be erased are sequentially stored in the page following the page in which the numbers of the pages onto which the new data is written are stored.

Subsequently, the device sets the erase backup flag 322 located in the backup area at step S955. Here, the value is set to 0x0.

At step S960, the device performs the function of erasing the existing data from the pages corresponding to the page numbers calculated at step S905.

Here, when the device is not powered off while the erase function is being performed (S965) and when erasing data from the corresponding pages in the data area is completed (S970), the device erases the entire backup area at step S975. In this case, because the backup area is a single sector formed of 16 pages in an embodiment, the backup area may be erased all at once using a sector erase function. Accordingly, the update function is completed.

However, if the device is powered off in the state in which the erase function (S960) has not been completed (S965), when rebooted, the device may realize at step S980 that both the update backup flag 323 and the erase backup flag 322 located in the backup area are set. This indicates that power was turned off in the state in which erasing of the existing data was not completed. In this case, using the page numbers stored in the backup area, which are the numbers of the pages in which the existing data is stored, the corresponding pages in the data area are erased at step S985. Accordingly, garbage data in the data area, which is created because the function of writing new data or the function of erasing the exiting data is partially performed, may be erased. Subsequently, the device erases the entire backup area at step S975.

Figure 11:
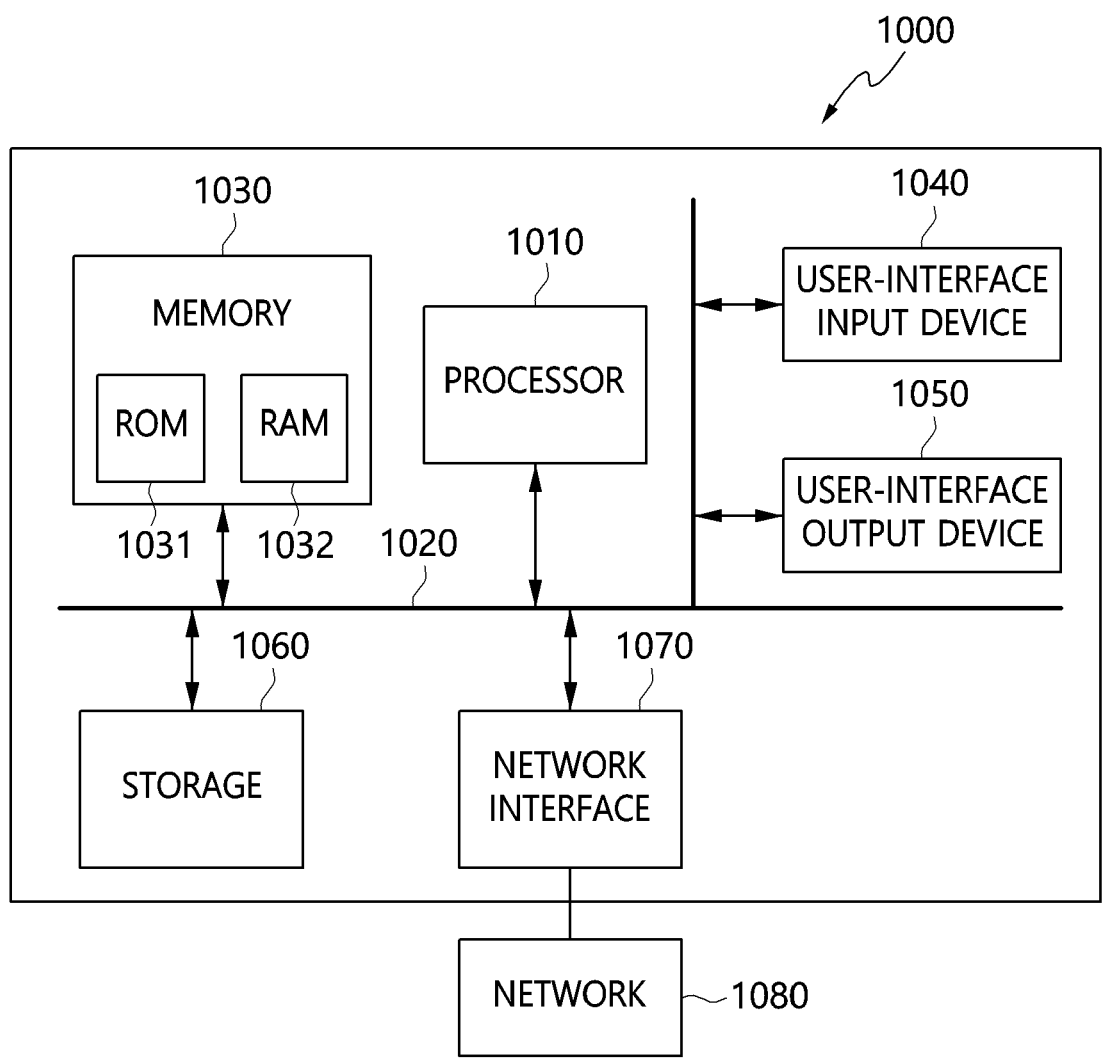
FIG. 11 is a view illustrating a computer system configuration according to an embodiment.

FIG. 11 is a view illustrating a computer system configuration according to an embodiment.

The device equipped with flash memory according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

According to an embodiment, existing data stored in flash memory may be prevented from being lost even in an unexpected situation in which power is turned off during a data-processing procedure, such as writing, erasing, or updating data, in flash memory mounted in a low-specification embedded device.

According to an embodiment, the security of a data-processing procedure in flash memory, in which important information is stored, is improved, whereby users may use an application service based on flash memory in various devices without anxiety.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. A device equipped with flash memory, comprising:
memory in which at least one program is recorded; and
a processor for executing the program,
wherein the memory includes flash memory including a data area and a backup area,
wherein the program stores data in units of pages in the data area,
wherein the data is stored in a single page when the data has a size capable of being stored in a single page, and
the data is divided into two or more segments and stored in two or more pages when the data has a size greater than a size capable of being stored in a single page, wherein a first segment is stored in a single page, and at least one additional segment is stored in another page, and,
wherein the backup area has backup flags recorded thereon, the backup flags indicating whether a data-processing procedure of the flash memory, which includes write, erase, and update operations, has been completed or stopped during the procedure,
wherein when the data has a size capable of being stored in a single page, a segment number, a segment offset, a size of a file name of the data, a size of the data, the file name, and the data are stored in a segment corresponding to the data, and a remaining area in the page is maintained empty.

2. The device of claim 1, wherein:
the first segment is stored in a single page along with a segment number thereof, a segment offset thereof, a size of a file name of the data, a size of the data, and the file name,
the at least one additional segment is stored in another page along with a segment number thereof and a segment offset thereof,
the segment number indicates a sequential position of the divided data and the segment offset indicates a number of pages between a page in which a current segment is stored and a page in which a next segment is stored,
the backup area is located in a last sector of the flash memory, and the backup flags, in which write, erase, and update states are recorded, and page numbers of pages on which writing or erasing is to be performed are recorded in the backup area, and
the page numbers of the pages on which writing or erasing is to be performed are recorded in a page following a page in which the backup flags are recorded.

3. The device of claim 2, wherein, when the program writes new data to the flash memory, the program performs:
   calculating page numbers of pages onto which the new data is to be written, among empty pages in the data area;
   sequentially storing the calculated page numbers in the backup area and setting a write backup flag;
   writing the new data onto the pages, corresponding to the calculated page numbers, in the data area; and
   completely erasing the backup area when writing the new data is completed.

4. The device of claim 3, wherein:
   when the device is powered off before completion of the writing and when the write backup flag located in the backup area is determined to be set after the device is rebooted, the program further performs erasing the pages in the data area corresponding to the page numbers stored in the backup area, which are the page numbers of the pages onto which the new data is to be written.

5. The device of claim 2, wherein, when the program erases existing data stored in the flash memory, the program performs:
   calculating page numbers of pages to be erased, among pages in which the existing data is stored in the data area;
   sequentially storing the calculated page numbers in the backup area and setting an erase backup flag located in the backup area;
   erasing the existing data stored in the pages, corresponding to the calculated page numbers, in the data area; and
   completely erasing the backup area when erasure of the existing data is completed.

6. The device of claim 5, wherein:
   when the device is powered off before completion of the erasure and when the erase backup flag located in the backup area is determined to be set after the device is rebooted, the program further performs erasing the pages in the data area corresponding to the page numbers stored in the backup area, which are the page numbers of the pages to be erased.

7. The device of claim 2, wherein, when the program updates data stored in the flash memory, the program performs:
   calculating page numbers of pages in which existing data to be erased is stored in the data area;
   calculating page numbers of pages onto which new data is to be written, among empty pages in the data area;
   sequentially storing, in the backup area, the calculated page numbers of the pages onto which the new data is to be written and setting an update backup flag located in the backup area;
   writing the new data onto the pages corresponding to the calculated page numbers;
   sequentially storing, in the backup area, the calculated page numbers of the pages in which the existing data to be erased is stored and setting an erase backup flag located in the backup area when writing the new data is completed;
   erasing the existing data from the pages corresponding to the calculated page numbers; and
   completely erasing the backup area when erasure of the existing data is completed.

8. The device of claim 7, wherein the page numbers of the pages onto which the new data is to be written and the page numbers of the pages in which the existing data to be erased is stored are sequentially recorded in different respective pages.

9. The device of claim 7, wherein:
   when the device is powered off before completion of the update and when the update backup flag and the erase backup flag are respectively determined to be set and cleared after the device is rebooted, the program further performs erasing the pages in the data area corresponding to the page numbers stored in the backup area, which are the page numbers of the pages onto which the new data is to be written.

10. The device of claim 7, wherein:
    when the device is powered off before completion of the update and when both the update backup flag and the erase backup flag are determined to be set after the device is rebooted, the program further performs erasing the pages in the data area corresponding to the page numbers stored in the backup area, which are the page numbers of the pages in which the existing data is stored.

11. A method for writing new data to flash memory in a device in which the flash memory, including a data area and a backup area, is embedded, the method comprising:
    calculating page numbers of pages onto which the new data is to be written, among empty pages in the data area;
    sequentially storing the calculated page numbers in the backup area and setting a write backup flag;
    writing the new data onto the pages, corresponding to the calculated page numbers, in the data area; and
    completely erasing the backup area when writing the new data is completed.

12. The method of claim 11, further comprising:
    when the device is powered off before completion of the writing and when the write backup flag located in the backup area is determined to be set after the device is rebooted,
    erasing the pages in the data area corresponding to the page numbers stored in the backup area, which are the page numbers of the pages onto which the new data is to be written.

13. A method for erasing existing data stored in flash memory in a device in which the flash memory, including a data area and a backup area, is embedded, the method comprising:
    calculating page numbers of pages to be erased, among pages in which the existing data is stored in the data area;
    sequentially storing the calculated page numbers in the backup area and setting an erase backup flag located in the backup area;
    erasing the existing data stored in the pages corresponding to the calculated page numbers; and
    completely erasing the backup area when erasure of the existing data is completed.

14. The method of claim 13, further comprising:
    when the device is powered off before completion of the erasure and when the erase backup flag located in the backup area is determined to be set after the device is rebooted,
    erasing the pages in the data area corresponding to the page numbers stored in the backup area, which are the page numbers of the pages to be erased.

15. A method for updating data stored in flash memory in a device in which the flash memory, including a data area and a backup area, is embedded, the method comprising:
- calculating page numbers of pages in which existing data to be erased is stored in the data area;
- calculating page numbers of pages onto which new data is to be written, among empty pages in the data area;
- sequentially storing, in the backup area, the calculated page numbers of the pages onto which the new data is to be written and setting an update backup flag located in the backup area;
- writing the new data to the pages corresponding to the calculated page numbers;
- sequentially storing, in the backup area, the calculated page numbers of the pages in which the existing data to be erased is stored and setting an erase backup flag located in the backup area when writing the new data is completed;
- erasing the existing data stored in the pages corresponding to the calculated page numbers; and
- completely erasing the backup area when erasing the existing data is completed.

16. The method of claim 15, further comprising:
when the device is powered off before completion of the update and when the update backup flag and the erase backup flag are respectively determined to be set and cleared after the device is rebooted,
erasing the pages in the data area corresponding to the page numbers stored in the backup area, which are the page numbers of the pages onto which the new data is to be written.

17. The method of claim 15, further comprising:
when the device is powered off before completion of the update and when both the update backup flag and the erase backup flag are determined to be set after the device is rebooted,
erasing the pages in the data area corresponding to the page numbers stored in the backup area, which are the page numbers of the pages in which the existing data is stored.

18. The device of claim 1, wherein:
the first segment is stored in a single page along with a segment number thereof, a segment offset thereof, a size of a file name of the data, a size of the data, and the file name,
the at least one additional segment is stored in another page along with a segment number thereof and a segment offset thereof.

19. The device of claim 18, wherein:
the segment number indicates a sequential position of the divided data and the segment offset indicates a number of pages between a page in which a current segment is stored and a page in which a next segment is stored.

* * * * *